United States Patent
Kondo (10) Patent No.: US 6,368,247 B1
(45) Date of Patent: Apr. 9, 2002

(54) SPEED RATIO CONTROL SYSTEM FOR CONTINUOUSLY VARIABLE TRANSMISSION

(75) Inventor: Kaoru Kondo, Aichi (JP)

(73) Assignee: Mitsubishi Jidosha Kogyo Kabushiki, Tokyo (JP)

( * ) Notice: Subject to any disclaimer, the term of this patent is extended or adjusted under 35 U.S.C. 154(b) by 0 days.

(21) Appl. No.: 09/559,342

(22) Filed: Apr. 27, 2000

(30) Foreign Application Priority Data

Apr. 28, 1999 (JP) ............................................. 11-121496
Nov. 9, 1999 (JP) ............................................. 11-318598

(51) Int. Cl.[7] .......................... B60K 41/12; F16H 59/48
(52) U.S. Cl. ........................... 477/47; 477/118; 477/120
(58) Field of Search ............................. 477/47, 44, 37, 477/118, 120, 115

(56) References Cited

U.S. PATENT DOCUMENTS

| | | | | |
|---|---|---|---|---|
| 5,586,953 A | * | 12/1996 | Abo | 477/47 |
| 5,611,748 A | * | 3/1997 | Kashiwabara | 477/47 |
| 5,655,991 A | * | 8/1997 | Lardy et al. | 477/37 X |
| 5,722,500 A | * | 3/1998 | Toukura et al. | 477/47 X |
| 5,730,680 A | * | 3/1998 | Toukura | 477/46 |
| 5,749,804 A | * | 5/1998 | Toukura | 477/47 |
| 5,913,746 A | * | 6/1999 | Bauerle | 477/47 |

FOREIGN PATENT DOCUMENTS

| | | | | |
|---|---|---|---|---|
| GB | 2276683 | * | 10/1994 | 477/47 |
| JP | 3199754 | * | 8/1991 | 477/47 |
| JP | 2840233 B2 | | 10/1998 | |

* cited by examiner

Primary Examiner—Charles A Marmor
Assistant Examiner—Ha Ho (57) ABSTRACT

A continuously variable transmission that can provide a sufficient engine braking during a downhill running time with neither complicating the control nor inviting an increase in the program capacity is established. In a gear ratio control system 60 for gear ratios in the continuously variable transmission coupled to an engine, setting means 51 to 55 set a target speed of an input unit 21 of the continuously variable transmission during the downhill running time on the basis of a target output of the engine. Control means 56 controls the gear ratios of the continuously variable transmission so that the real speed of the input unit 21 may become the target speed of the input unit 21.

6 Claims, 7 Drawing Sheets

A10 ALL LEARNING CONDITIONS SATISFIED ?
A20 LEARNING DECIDING PREDETERMINED
    TIME $t_{TEEB}$ ELAPSED ?
A30 CALCULATE REFERENCE TORQUE $TE_{EB0}$
A40 READ PRECEDING LEARNING REFERENCE
    TORQUE $TE_{EB}$ (OLD)
A50 SET PRESENT LEARNING REFERENCE
    TORQUE $TE_{EB}$ TO UPDATE LEARNING
    REFERENCE TORQUE $TE_{EB}$

S10 DOWNHILL CONTROL ?

S20 DECISION TIMER COUNTING CONDITION SATISFIED ?

S30 PREDETERMINED TIME ELAPSED AFTER ACCELERATOR DEPRESSION START ?

S40 ACCELERATOR OPENING LARGE ?

S50 PREDETERMINED TIME ELAPSED AFTER DECELERATION START BY BRAKING ?

S60 DECELERATION G BY BRAKING HIGH ?

S70 ACCELERATION RATIO LARGE ?

S80 CHANGE LEARNING TARGET ACCELERATION VALUE ($GXT_L$)
$GXTL(NEW) = GXT_L(OLD) + EP$
(WEAKEN ENGINE BRAKE)

S90 BRAKING RATIO LARGE ?

S100 CHANGE LEARNING TARGET ACCELERATION VALUE (GXTL)
$GXTL(NEW) = GXTL(OLD) - EP$
(STRENGTHEN ENGINE BRAKE)

S110 CALCULATE TARGET ACCELERATION BASE VALUE ($GXT_B$) ACCORDING TO VEHICLE SPEED AND ROAD GRADE

S120 CALCULATE TARGET ACCELERATION (GXT)
$GXT = GXT_B + GXT_L$

S130 SET TARGET DRIVING FORCE (FET)

S140 SET TARGET OUTPUT (WET)

S150 SET TARGET PRIMARY SPEED (NPT)

S160 CONTROL GEAR RATIO FOR PRIMARY SPEED (NP) TO BECOME TARGET VALUE (NPT)

S170 CALCULATE TARGET PRIMARY SPEED (NPT) ACCORDING TO VEHICLE SPEED AND ACCELERATOR OPENING

FIG. 7
PRIOR ART

SPEED RATIO CONTROL SYSTEM FOR CONTINUOUSLY VARIABLE TRANSMISSION

BACKGROUND OF THE INVENTION

1. Field of the Invention

The present invention relates to a gear ratio control system for a continuously variable transmission to be used in a vehicle.

2. Related Art

The continuously variable transmission is represented by a belt type continuously variable transmission which is provided with a primary pulley (or an input unit), a secondary pulley (or an output unit), and a belt.

Moreover, the feedback control is so made that the real primary speed of the primary pulley may coincide with the target primary speed.

Figure 7:
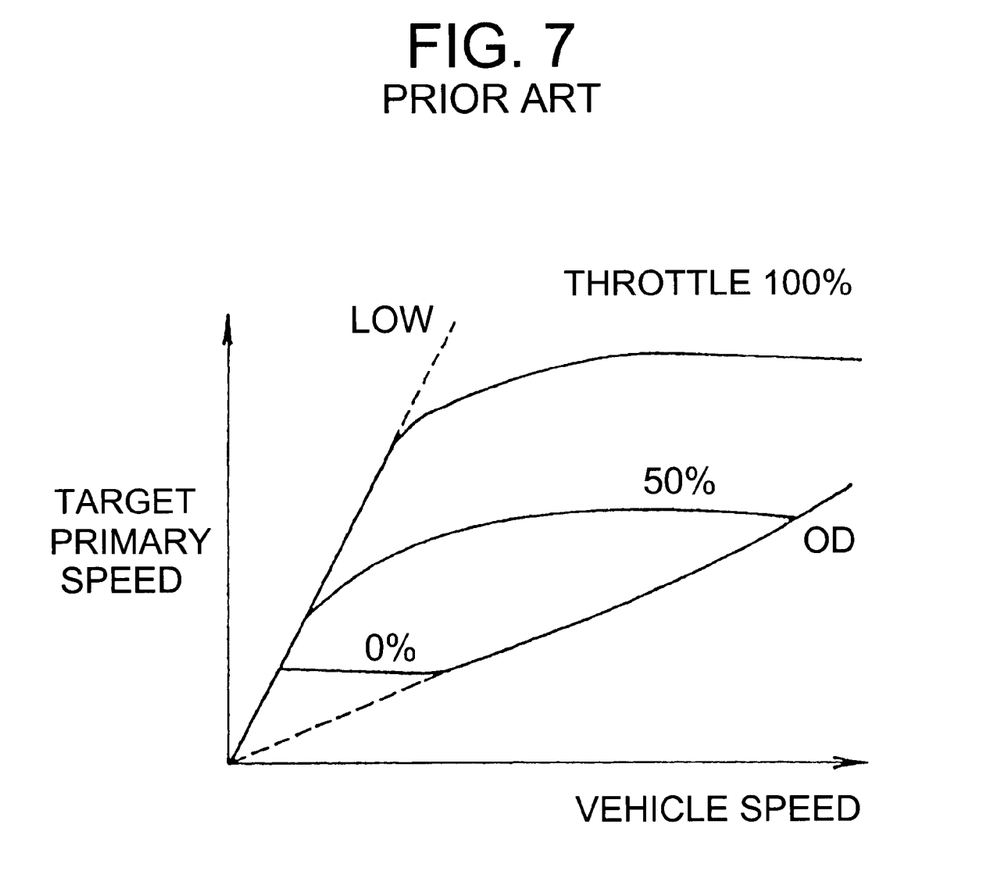
FIG. 7 is a diagram for explaining the gear ratio control during a downhill running time by the gear ratio control system of the continuously variable transmission of the prior art.

In this case, the target primary speed is set according to a vehicle speed and a throttle opening on the basis of the control characteristics, as illustrated in FIG. 7.

With the throttle being fully closed (to 0%), for example, the target primary speed is so set, as illustrated in FIG. 7, that the gear ratio of the continuously variable transmission may be an overdrive (OD) according to the vehicle speed.

If the throttle is fully closed during a downhill running time and if the target primary speed is set so that the gear ratio of the continuously variable transmission may be the overdrive (OD), as illustrated in FIG. 7, however, a sufficient engine braking may not be established.

In order to establish the sufficient engine braking during the downhill running time, therefore, it is conceivable (as disclosed in Japanese Patent No. 2840233, for example) to make the gear ratio control of the continuously variable transmission so that the real acceleration of the vehicle may become the target acceleration set on the basis of the engine output characteristics.

During an ordinary running time such as during a flat road running time, generally, the gear ratio control of the continuously variable transmission is made such that the real primary speed of the primary pulley belonging to the continuously variable transmission may become the target primary speed. Therefore, it complicates the control and invites an increase in the program capacity to add, as in the aforementioned prior art, the gear ratio control of the continuously variable transmission, in which the rear acceleration of the vehicle becomes the target acceleration for the downhill running. At the control switching time, on the other hand, the gear ratio may abruptly change at the control switching time to make the driver feel a physical disorder and to deteriorate the drivability.

When the throttle is fully closed during the downhill running, on the other hand, the engine output characteristics may disperse to deviate the target acceleration from the intrinsic value.

In this case, the actual acceleration (or the real acceleration) may be controlled to a target acceleration shifted from the intrinsic target acceleration. This makes it difficult to make an accurate control so that the rear acceleration may be the intrinsic target acceleration.

The engine braking state of the vehicle running downhill depends on the preference of the driver. Some driver desires to run downhill promptly with no engine braking, and another driver desires to run slowly with an intense engine braking. If the target acceleration at the downhill running time is uniformly set according to the road slope and the vehicle speed, therefore, the preference of the driver is ignored to deteriorate the driving feel.

SUMMARY OF THE INVENTION

The invention has been conceived in view of the problems thus far described and has an object to provide a gear ratio control system for a continuously variable transmission, which can establish a sufficient engine braking at a downhill running time with neither complicating the control nor inviting an increase in the program capacity.

Another object of the invention is to provide a gear ratio control system for a continuously variable transmission, which is enabled to establish a stable engine braking feel by making an accurate gear ratio control without being influenced by the dispersion in the engine output characteristics with the fully closed throttle even while the vehicle is running downhill.

Still another object of the invention is to provide a gear ratio control system for a continuously variable transmission, which can control the engine braking state during the downhill running time in accordance with the preference of the driver.

According to a first aspect of the invention, there is provided a gear ratio control system for controlling gear ratios of a continuously variable transmission coupled to an engine, comprising: a setting element for setting a target speed of an input unit of the continuously variable transmission at a downhill running time on the basis of a target output of the engine; and a control element for controlling the gear ratios of the continuously variable transmission so that the rear speed of the input unit may become the target speed of the same.

According to a second aspect of the invention, on the other hand, the setting element includes: a decision element for deciding whether or not learning conditions are satisfied with a fully closed throttle; an updating element for updating a learning reference torque, if said decision element decides that the learning conditions are satisfied, on the basis of a reference torque or the engine torque corresponding to a real engine output and a learning reference torque set at the preceding time of satisfying the learning conditions; and a determining element for determining engine output characteristics on the basis of the learning reference torque updated by the updating element.

According to a third aspect of the invention, on the other hand, the setting element includes: a target acceleration setting element for setting a target acceleration according to a road slope so that the real acceleration may become the target acceleration; a properness deciding element for deciding the excess/deficiency of an engine braking; and a learning correcting element for learning and correcting the target acceleration on the basis of the decision of the properness deciding element.

According to a fourth aspect of the invention, on the other hand, the setting element includes: a target acceleration setting element for setting a target acceleration according to a road slope; a target output setting element for setting a target output of the engine in accordance with the target acceleration; and a target speed setting element for setting a target speed of the input unit of the continuously variable transmission in accordance with the target output.

BRIEF DESCRIPTION OF THE DRAWINGS

FIGS. 2A and 2B are for explaining the gear ratio control system of the continuously variable transmission according the embodiment of the invention, in which

DESCRIPTION OF THE PREFERRED EMBODIMENT

A preferred embodiment of the invention will be described with reference to the accompanying drawings.

A gear ratio control system of a continuously variable transmission according to one preferred embodiment of the invention will be described with reference to FIGS. 1 to 6. Here, in this embodiment, the continuously variable transmission (CVT) is exemplified by a belt-type continuously variable transmission.

Figure 2A:
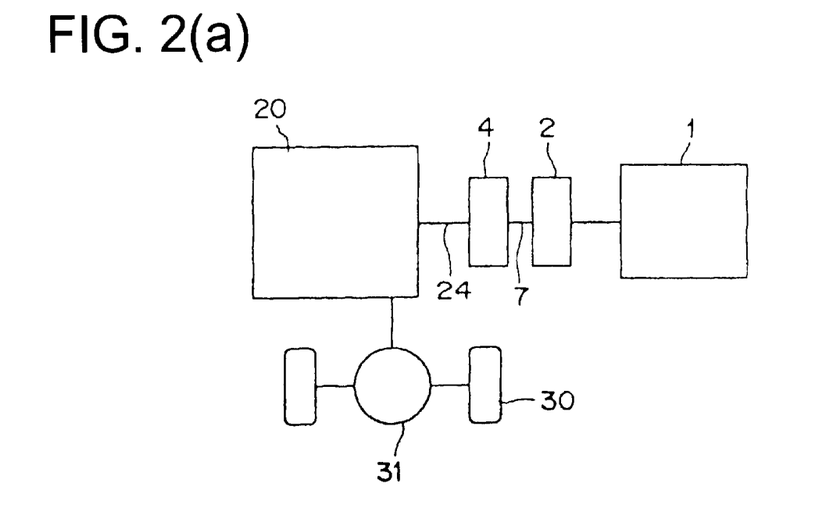
FIG. 2A is a schematic diagram showing the entire construction of a drive line having the continuously variable transmission.

At first, a power transmission mechanism according to this embodiment will be described. In this power transmission mechanism, as shown in FIG. 2A, a drive force outputted from an engine 1 is transmitted through a torque converter 2 (as will be abbreviated into the "T/C"), a belt type continuously variable gear ratio mechanism 20 and a differential gear 31 to tires 30.

Between an output shaft 7 of the torque converter 2 and an input shaft 24 of the belt type continuously variable gear ratio mechanism 20, a forward-backward switching mechanism 4 is provided. The rotation of the engine 1 is transmitted to the continuously variable gear ratio mechanism 20 through the T/C 2 and the mechanism 4.

Figure 2B:
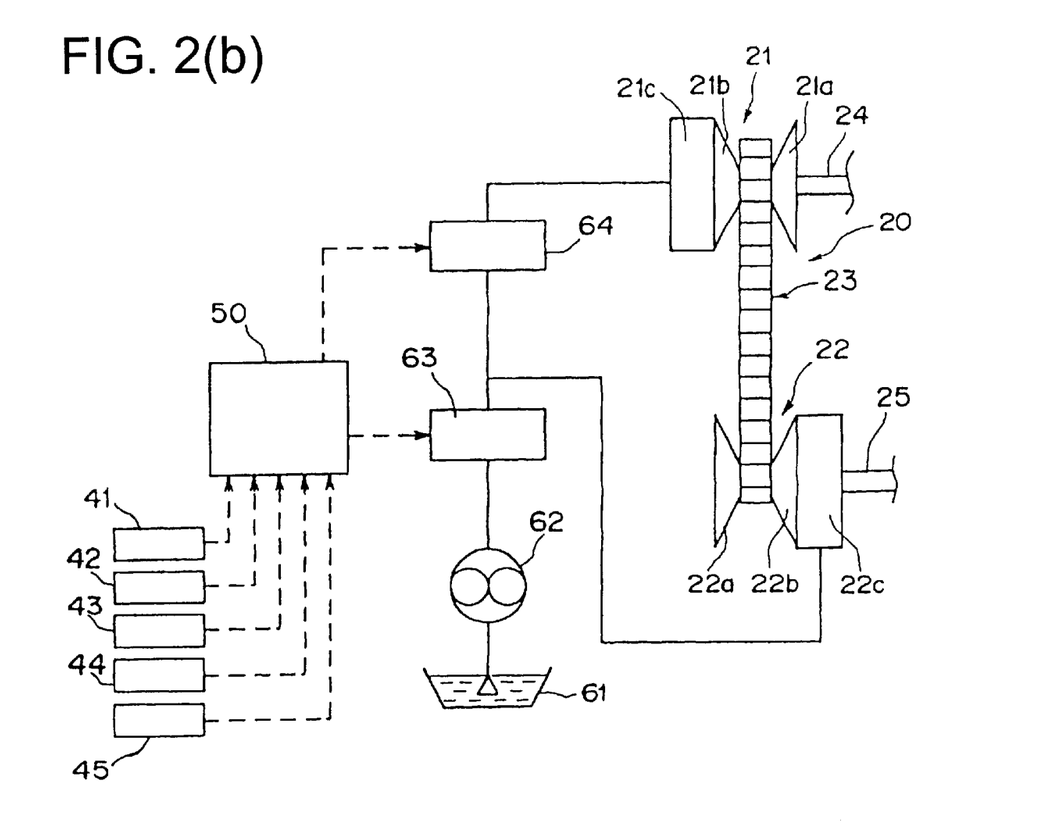
FIG. 2B is a schematic diagram showing the construction of the continuously variable transmission.

The continuously variable gear ratio mechanism 20 is constructed, as shown in FIG. 2B, to include a primary pulley (or input side pulley) 21, a secondary pulley (or output side pulley) 22 and a belt 23. The rotation, inputted from the forward-backward switching mechanism 4 to a primary shaft 24, is transmitted from the primary pulley 21, coaxial and integral with the primary shaft 24, to the secondary pulley 22, coaxial and integral with a secondary shaft 25.

The primary pulley 21 and the secondary pulley 22 are composed of two sheaves 21a and 21b and sheaves 22a and 22b made integrally rotatable, respectively. The individual sheaves 21a and 22a on one side are stationary sheaves fixed in the axial direction, whereas the other sheaves 21b and 22b are movable sheaves which are made movable in an axial direction thereof by hydraulic actuators (e.g., hydraulic pistons) 21c and 22c.

An oil pump 62 pressurizes and discharges oil in an oil tank 61, and this discharge pressure is regulated to a predetermined level (or a predetermined line pressure) by a regulator valve 63. To the hydraulic actuator 22c of the secondary pulley 22, a line pressure PL, which is regulated by the regulator valve 63, is applied. To the hydraulic piston 21c of the primary pulley 21, the working oil, the flow rate of which is regulated by a flow control valve 64 arranged downstream of the regulator valve 63, is applied, so that it may act as a gear ratio controlling oil pressure.

Here, it is important for the purpose of reducing the energy loss due to the oil pump 62 and enhancing the durability of the transmission itself that the line pressure PL is made as low as possible within a range capable of retaining the power transmission while avoiding the slippage of the belt 23. On the basis of a CVT input torque TIN, a CVT input speed (or a primary speed) NP and a gear ratio RAT, a belt tension control pressure (i.e., a pressure corresponding to the line pressure PL) Pout is set so that the line pressure control is made by controlling the regulator valve 63 to regulate the discharge pressure of the oil pump 62 on the basis of that belt tension control pressure Pout.

The regulator valve 63 and flow rate control valve 64 are controlled by a command signal of a controller (e.g., an electronic control unit=ECU) 50. This ECU 50 is fed with individual detection signals such as those of an engine speed sensor (e.g., a crank angle sensor or a cam angle sensor) 41, an air flow sensor 42, a primary speed sensor (i.e., a first speed sensor) 43, a secondary speed sensor (i.e., a second speed sensor) 44, and a line pressure sensor 45 for detecting the line pressure PL. On the basis of these detection signals, the ECU 50 controls the regulator valve 63 and the flow rate control valve 64.

Here in this embodiment, the gear ratio control of the continuously variable transmission is made to establish a sufficient engine braking during a downhill running time.

Figure 1:
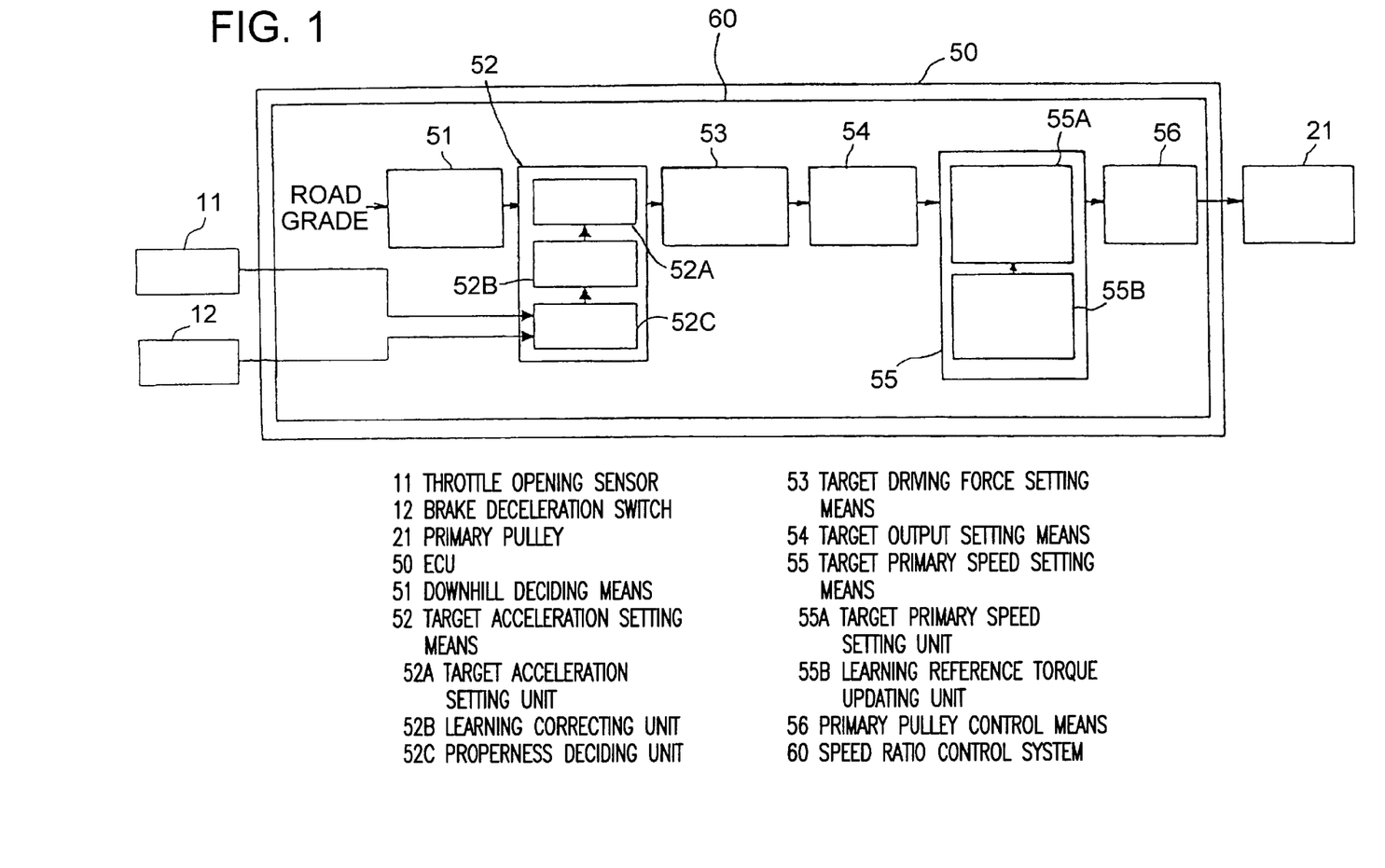
FIG. 1 is a functional block diagram showing a gear ratio control system for a continuously variable transmission according to one embodiment of the invention.

For this, as shown in the functional block diagram of FIG. 1, the ECU 50 is provided with a gear ratio control system 60. By this gear ratio control system 60, the gear ratio control of the continuously variable gear ratio mechanism 20 is made by setting the target primary speed so that the forward-backward real acceleration (i.e., real forward-backward G) of the vehicle may be the target acceleration during the downhill running time, and by making a feedback control so that the actual primary speed (i.e., real primary speed) may be identical with the target primary speed.

Here, the gear ratio control during the downhill running time is made. This gear ratio control is desirably applied to a fully closed throttle (including a substantially fully closed throttle) at the time when the throttle opening is not more than a predetermined value.

Here in this embodiment, the gear ratio of the continuously variable transmission is controlled so that an engine braking according to the preference of the driver may be obtained during the downhill running state.

The gear ratio control system 60 is constructed, as shown in FIG. 1, to include: downhill deciding means 51; target acceleration setting means 52; target driving force setting means 53; target output setting means 54; target primary speed setting means 55; and primary pulley control means 56 for controlling the primary pulley 21 (i.e., the oil pressure to the hydraulic actuator 21c) on the basis of the target primary speed set by the target primary speed setting means 55.

Of these means, the downhill deciding means 51 decides whether or not the vehicle is running downhill on the basis of the road slope information. During the downhill running, the downhill deciding means 51 outputs a signal to the target acceleration setting means 52 for the gear ratio control by the gear ratio control system 60.

The target acceleration setting means 52 is composed of a target acceleration setting unit 52A, a learning correcting unit (or learning correction means) 52B, and a properness deciding unit (or properness deciding means) 52C. Of these units, the target acceleration setting unit 52A sets a target acceleration GXT from a vehicle speed V and a road slope SL (=weight×slope resistance/vehicle weight), that is, [GXT (V, SL)], and outputs a signal corresponding to the set target acceleration GXT, to the later-described target driving force setting means 53. Here, the weight×slope resistance RS takes a value which is determined by subtracting an acceleration resistance, an air resistance, and a rolling resistance from the engine driving force.

Specifically, the target acceleration setting unit 52A calculates the target acceleration GXT by adding a target acceleration learning value GXTL set on the basis of the driving operation of the driver, to a target acceleration base value GXTB set on the basis of the vehicle speed V and the road slope SL. The target acceleration GXT is expressed by the following Formula (1):

$$GXT=GXT_B+GXTL \qquad (1)$$

When the target acceleration GXT is no less than its upper limit GXTCLU (GXT≧GXTCLU), however, it is set to the target acceleration upper limit GXTCLU. When the target acceleration GXT is no more than its lower limit GXTCLL (GXT≦GXTCLL), however, it is set to the target acceleration lower limit GXTCLL. By thus giving the upper limit and the lower limit to the target acceleration, the controls are intended to be simple and stable.

Figure 3:
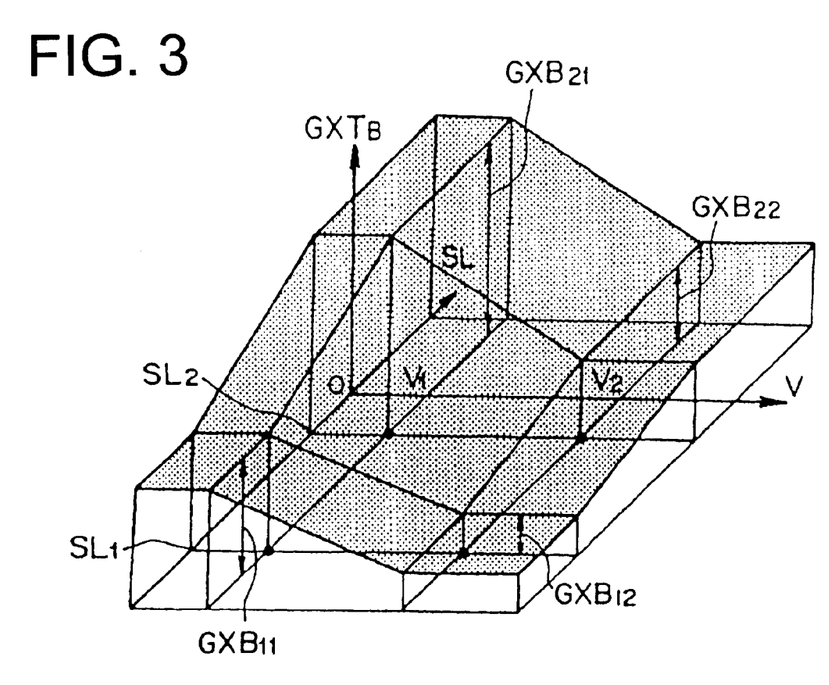
FIG. 3 is a diagram for explaining how to set a target acceleration of the gear ratio control system of the continuously variable transmission according to the embodiment of the invention.

Here, the target acceleration base value GXTB is so set that it is meshed against the vehicle speed V and the toad slope SL with half-tone dots in a three-dimensional coordinates of FIG. 3. Specifically, the target acceleration base value GXTB is determined by multiplying the target accelerations $GXB_{11}$, $GXB_{12}$, $GXB_{21}$, and $GXB_{22}$ set on the basis of specific values $V_1$ and $V_2$ of the vehicle speed V and specific values $SL_1$ and $SL_2$ of the road slope SL, individually by a vehicle speed coefficient KV and a road slope coefficient KSL, and is expressed by the following Formula (2).

Here, for calculating the target acceleration base value GXTB, the vehicle speed coefficient KV is calculated on the basis of the vehicle speed V, the first predetermined vehicle speed V1 and the second predetermined vehicle speed $V_2$ ($V_2>V_1$) [$KV=(V-V_1)/(V_2-V_1)$]. On the other hand, the road slope coefficient KSL is calculated on the basis of the road slope SL, the first predetermined road slope SL1, and the second predetermined road slope $SL_2$ ($SL_2>SL_1$) [$KSL=(SL-SL_1)/(SL_2-SL_1)$].

$$GXTB = (1-KV)\cdot(1-KSL)\cdot GXB_{11} + KV \cdot \qquad (2)$$
$$(1-KSL)\cdot GXB_{11} + (1-KV)\cdot KSL \cdot GXB_{21} +$$
$$KV\cdot KSL\cdot GXB_{22}$$

Here, the vehicle speed coefficient KV is set to 0, if it is smaller than 0 (KV<0), but to 1 if it is larger than 1 (KV>1). On the other hand, the road slope coefficient KSL is set to 0, if it is smaller than 0 (KSL<0), but to 1 if it is larger than 1 (KSL>1).

Specifically, the target acceleration setting unit 52A is preferably constructed to have a three-dimensional target acceleration setting map in which the target acceleration base value GXTB is related to the vehicle speed V and the road slope SL, as illustrated in FIG. 3, so that the target acceleration base value $GXT_B$ may be set on the basis of that target acceleration setting map.

The learning correcting unit 52B learns and corrects the aforementioned target acceleration GXT so that the acting state of the engine braking during the downhill running time may be controlled according to the preference of the driver.

Specifically, the learning correcting unit 52B increases/decreases the target acceleration GXT ($GXT=GXT_B+GXTL$) by correcting to increase/decrease the aforementioned target acceleration learning value GXTL on the basis of the decision on the excess/deficiency of the engine braking by the later-described properness deciding unit 52C. When it is decided that the engine braking is excessive, for example, the target acceleration learning value $GXT_L$ is corrected to increase by the following Formula. Letters EP indicate a predetermined minute value.

$$GXT_{L(NEW)}=GXT_{L(OLD)}+EP \qquad (3)$$

When it is decided that the engine braking is deficient, on the contrary, the target acceleration learning value GXTL is corrected to decrease by the following Formula.

$$GXT_{L(NEW)}=GXT_{L(OLD)}-EP \qquad (4)$$

Moreover, the corrected GXTL(NEW) is learned and stored in the storage means (not shown). Here in the initial state where no learning has ever been performed by the learning correcting unit 52B, the target acceleration learning value $GXT_L$ is set at a predetermined initial value $GXT_{LO}$. On the other hand, the target acceleration learning value $GXT_L$ is set with an upper limit $GXT_{LH}$ and a lower limit $GXT_{LL}$, between which the learning correcting unit 52B learns and corrects the target acceleration learning value $GXT_L$. In short, the corrected value $GXT_L$(NEW) is set to the upper limit $GXT_{LH}$, when it is larger than the upper limit $GXT_{LH}$ ($GXT_{L(NEW)}>GXT_{LH}$), and to the lower limit $GXT_{LL}$ when it is smaller than the lower limit $GXT_{LL}$ ($GXT_{L(NEW)}<GXT_{LL}$). By thus giving the target acceleration learning value $GXT_L$ the upper limit and the lower limit, the controls are intended to be stable.

The aforementioned learning result ($GXT_{L(NEW)}$) is retained in the aforementioned storage means even after the ignition key is turned OFF. In the next control, moreover, the target acceleration GXT is set such that the value $GXT_L$ (NEW)learned and corrected in this control is added by the target acceleration setting unit 52A to the target acceleration base value $GXT_B$.

The properness deciding unit 52C decides the excess and deficiency of the engine braking on the basis of the driver's operation to demand the acceleration/deceleration of the vehicle, and outputs the decision result to the aforementioned learning correcting unit 52B.

Specifically, the properness deciding unit 52C decides that the engine braking is excessive, when the time ratio of a deceleration by the braking is smaller during the downhill running whereas the time ratio of a depression of the accelerator is larger, and outputs a signal (i.e., an excess signal) to the learning correcting unit 52B. When the time ratio of a depression of the accelerator is smaller during the downhill running whereas the time ratio of a deceleration by the braking is larger, on the contrary, the properness deciding unit 52C decides that the engine braking is deficient, and outputs a signal (i.e., a deficiency signal) to the learning correcting unit 52B.

More specifically, the properness deciding unit 52C decides the excess/deficiency in the following manners.

First, the excess decision is premised for its start by that all the following excess deciding timer counting conditions (1) to (5) are satisfied. These excess deciding timer counting conditions (1) to (5) are provided for accurate decisions by limiting the timing for starting the excess decision to a steady state at the downhill running time:

(1) that no or little deceleration is effected by a braking, i.e., that the forward-backward deceleration (or the braking deceleration) GXBG accompanying the braking operation is smaller than a predetermined learning braking deceleration $GXBG_{TKG}$ ($GXBG<GXBG_{TKG}$);

(2) that a vehicle speed V is within a predetermined range, i.e., that the vehicle speed V is higher than a predetermined learning vehicle speed lower limit $V_{TKGA}$ (e.g., about 10 Km/h) and lower than a predetermined learning vehicle speed upper limit $V_{TKGB}$ (e.g., about 100 Km/h) ($V_{TKGA}<V<V_{TKGB}$);

(3) that a road slope SL is within a predetermined range, i.e., that the road slope SL is higher than a predetermined learning road slope lower limit $SL_{TKGA}$ (e.g., about 5%) and lower than a predetermined learning road slope upper limit $SL_{TKGB}$ (e.g., about 10 to 15%) ($SL_{TKGA}<SL<V_{TKGB}$);

(4) that an absolute value of the difference between the forward-backward acceleration GX and the target acceleration GXT is smaller than a predetermined learning downhill target acceleration deviation $GX_{TKG}$ ($|GXT-GX|<GX_{TKG}$); and (5) that a depression of the accelerator is small, i.e., that a throttle opening voltage VTH outputted from a throttle opening sensor (i.e., acceleration/deceleration demanding operation detecting means) 11 is lower than a predetermined learning throttle opening voltage $VTH_{TKG}$ ($VTH<VTH_{TKG}$).

With the aforementioned individual excess deciding timer counting conditions (1) to (5) being satisfied, if the throttle opening voltage VTH is equal to or higher than the aforementioned throttle opening voltage $VTH_{TKG}$ ($VTH \geq VTH_{TKG}$), the counting operation of the excess deciding timer TKG is started in the properness deciding unit 52C.

At the instant when any of the following excess decision starting conditions (1) and (2) is satisfied, moreover, the excess decision on whether or not the engine braking is excessive is made:

(1) that a predetermined time $t_{KG}$ has elapsed from the depression start of the accelerator, i.e., that the counted value of the excess deciding timer TKG reaches the time $t_{KG}$ ($TKG=t_{KG}$); and (2) that the accelerator is deeply depressed, i.e., that the throttle opening voltage VTH is higher than the voltage $VTH_{TKGS}$, which is higher than the aforementioned throttle opening voltage $VTH_{TKG}$ ($Vth \geq VTH_{TKGS}$)

The aforementioned excess decision starting condition (1) is to sufficiently sample the data for the excess decision, and the excess decision starting condition (2) is to perform, when the accelerator depression is so deep that the engine braking excess may be decided, the excess decision even if the predetermined time tKG is not reached with the much sampling data.

At the instant when any of the aforementioned excess decision starting conditions (1) and (2) is satisfied, the properness deciding unit 52C judges whether or not the following excess deciding conditions (1) and (2) are satisfied, to decide that the engine braking is excessive if all the conditions are satisfied, and outputs a signal (i.e., an excess signal) to the learning correcting unit 52B:

(1) that a time ratio for the depression of the accelerator is large, i.e., that the time ratio TTH for the throttle opening voltage VTH to exceed a depression deciding throttle opening voltage $VTH_{TTH}$ after the start of the counting of the excess deciding timer TKG until any of the aforementioned excess decision starting conditions (1) and (2) is satisfied is larger than a predetermined excess deciding depression time ratio $TTH_{KG}$ ($TTH>TTH_{KG}$). This depression deciding throttle opening voltage $VTH_{TTH}$ is a threshold voltage for detecting that the accelerator is deeply depressed, and is set at a smaller value than $VTH_{TKGS}$; and (2) that a fluctuation range (or the acceleration range) of the vehicle speed V for the time period after the start of the counting of the excess deciding timer TKG until the satisfaction of any of the aforementioned excess decision starting conditions (1) and (2) is within an allowable fluctuation range, i.e., that an acceleration range VK ($VK=V_{KGMAX}-V_{KGMIN}$) to be calculated from the maximum $V_{KGMAX}$ and the minimum $V_{KGMIN}$ of the vehicle speed V for the time period is larger than a lower limit $VK_{KGA}$ and smaller than an upper limit $VK_{KGB}$ ($VK_{KGA}<VK<VK_{KGB}$). This is because for an excessively large acceleration range, the running state may shift from the downhill running with the engine braking to an accelerating state and because for an excessively small acceleration range, the target acceleration GTX need not be corrected, so that the control may be simplified and stabilized for those cases without any learning correction.

Here, a deficiency decision by the properness deciding means 52C will be described. This deficiency decision is also premised by the fact that all the following deficiency deciding timer counting conditions (1) to (5) similar to the aforementioned excess decision timer counting conditions (1) to (5) are satisfied:

(1) that a braking deceleration GXBG is smaller than a predetermined learning braking deceleration $GXBG_{TFG}$ ($GXBG<GXBG_{TFG}$);

(2) that the vehicle speed V is higher than a learning vehicle speed lower limit VTFGA and lower than a predetermined learning vehicle speed upper limit $V_{TFGB}$ ($V_{TFGA}<V<V_{TFGB}$);

(3) that the road slope SL is larger than a predetermined learning road slope lower limit SLTFGA and smaller than a predetermined learning road slope upper limit $SL_{TFGB}$ ($SL_{TFGA}<SL<SL_{TFGB}$);

(4) that the absolute value of the difference between the forward-backward GX and the target acceleration GXT is smaller than a predetermined learning downhill target acceleration deviation $GX_{TFG}$ ($|GXT-GX|<GX_{TFG}$); and (5) that the throttle opening voltage VTH is lower than a predetermined learning throttle opening voltage $VTH_{TFG}$ ($VTH<VTH_{TFG}$).

The individual decision values in these deficiency deciding timer counting conditions (1) to (5) can be set equal to those of the individual decision values of the excess decision timer counting conditions (1) to (5).

With the aforementioned individual deficiency deciding timer counting conditions (1) to (5) being satisfied, moreover, if a braking decelerating switch (i.e., acceleration/ deceleration demanding operation detecting means) 12 associated with the brake lamp (not shown) is turned ON, the properness deciding unit 52C starts the counting of a deficiency deciding timer TFG, and decides whether or not the engine braking is deficient, at the instant when any of the following deficiency decision starting conditions (1) and (2) is satisfied:

(1) that a predetermined time tFG has elapsed after the depression start of the accelerator, i.e., that the counted value of the deficiency deciding timer TFG reaches the time tFG (TFG=$t_{FG}$); and that the brake is deeply depressed, i.e., that the braking deceleration CXBG exceeds the learning braking deceleration GXBGTFG (GXBG≧GXBG$_{TFG}$).

The aforementioned deficiency decision starting condition (1) is to sufficiently sample the data for deciding the deficiency, and the deficiency decision starting condition (2) is to decide the deficiency even if the predetermined time tFG is not reached irrespective of the amount of the sampling data, when the braking depression is so deep as to enhance the possibility of deciding that the engine braking is deficient. Here in the deficiency decision starting condition (2), a value GXBG$_{TFGS}$ larger than GXBG$_{TFG}$ may be used for preventing the hunting thereby to provide a condition of GXBG≧GXBG$_{TFGS}$.

Next, in the properness deciding unit 52C, at the instant when any of the aforementioned deficiency decision starting conditions (1) and (2) is satisfied, it is decided whether or not the following deficiency deciding conditions (1) and (2) are satisfied. When all the conditions are satisfied, the properness deciding unit 52C decides that the engine braking is deficient, and outputs a signal (or an deficiency signal) to the learning correcting unit 52B:

(1) that a time ratio for the brake to be depressed is large, i.e., that a time ratio TBR for the braking decelerating switch 12 to be turned ON after the start of the counting of the deficiency deciding timer TFG until any of the aforementioned deficiency decision starting conditions (1) and (2) is satisfied is larger than a predetermined deficiency deciding braking time ratio TBRFG (TBR>TBR$_{FG}$); and (2) that a fluctuation range (or a deceleration width) of the vehicle speed V after the counting start of the deficiency deciding timer TFG until any of the aforementioned deficiency decision starting conditions (1) and (2) is satisfied is within a predetermined allowable fluctuation range, i.e., that a deceleration range VG (VG=V$_{FGMAX}$−V$_{FGMIN}$) to be calculated from the maximum V$_{FGMAX}$ and the minimum V$_{FGMIN}$ of the vehicle speed V for the time period is larger than a lower limit VG$_{FGA}$ and smaller than an upper limit VG$_{FGB}$ (VGFGA<VK<VG$_{FGB}$). This is because for an excessively large acceleration range, the running state may shift from the downhill running with the engine braking to a decelerating state with the braking operation and because for an excessively small deceleration range, the target acceleration GTX need not be corrected, so that the control may be simplified and stabilized for those cases without any learning correction.

The target driving force setting means 53 sets a target driving force FET of the vehicle for realizing the target acceleration GXT set by the aforementioned target acceleration setting means 52, and outputs a signal corresponding to the target driving force FET to the later-described target output setting means 54.

Specifically, the target driving force setting means 53 calculates a target acceleration resistance RA [=(W+W$_{IDIF}$+W$_{IPRI}$·RAT$^2$)·GXT] by adding a vehicle weight W, a weight WIDIF corresponding to a differential shaft inertia, and a product of a weight WIPRI corresponding to a primary shaft and a square of the gear ratio RAT, and by multiplying the sum by the target acceleration GXT set by the target acceleration setting means 52. The target driving force setting means 53 calculates the target driving force FET by adding the weight×the slope resistance, the air resistance RL and the rolling resistance RR to the calculated result, and the calculated target driving force FET is expressed by the following Formula (5):

$$FET=(W+W_{IDIF}+W_{IPRI} \cdot RAT_2) \cdot GXT+RS+RL+RR \qquad (5)$$

The target output setting means 54 sets the target output WET of the engine 1 to the target driving force FET set by the aforementioned target driving force setting means 53, and outputs the target output WET to the later-described target primary speed setting means 55.

Specifically, the target output setting means 54 calculates a net target output [FET·(r/iF)·NS] corresponding to the target driving force by multiplying a division of a tire radius r by a final gear ratio iF and a secondary speed NS. The target output setting means 54 then calculates a target output WET by adding the calculated net target output, a primary loss output (TLR·NP) calculate by multiplying an input rotation depending transmission loss torque TLR and the primary speed NP, and an engine loss output [(TIC+TLP)·NE] calculated by multiplying the sum of a crankshaft inertial torque TIC and an oil pump driving loss torque TLP and an engine speed NE. The resultant target output WET is expressed by the following Formula (6):

$$WET=FET \cdot (r/iF) \cdot NS+TLR \cdot NP+(TIC+TLP) \cdot NE \qquad (6)$$

Here, considering the load of an air-conditioner compressor, a product of a compressor load torque TLC and the engine speed NE may be added to the third term.

The target primary speed setting means 55 is constructed to include: a target primary speed setting unit 55A for setting a target primary speed NPT on the basis of the target output WET of the engine 1 set by the aforementioned target output setting means 54, a reference speed NE$_{EB}$ of the engine 1 and a learning reference torque TE$_{EB}$; and a learning reference torque updating unit 55B for updating the learning reference torque TE$_{EB}$ when predetermined learning conditions are satisfied. The target primary speed setting means 55 outputs the target primary speed NPT to the primary pulley control means 56.

Of these, the target primary speed setting unit 55A calculates the target primary speed NPT by subtracting the speed (WET/TE$_{EB}$) corresponding to the target output, as calculated by dividing the target output WET by the learning reference torque TE$_{EB}$, from the reference speed NE$_{EB}$, and the calculated target primary speed NPT is expressed by the following Formula (7):

$$NPT=NE_{EB}-(WET/TE_{EB}) \qquad (7)$$

Figure 4:
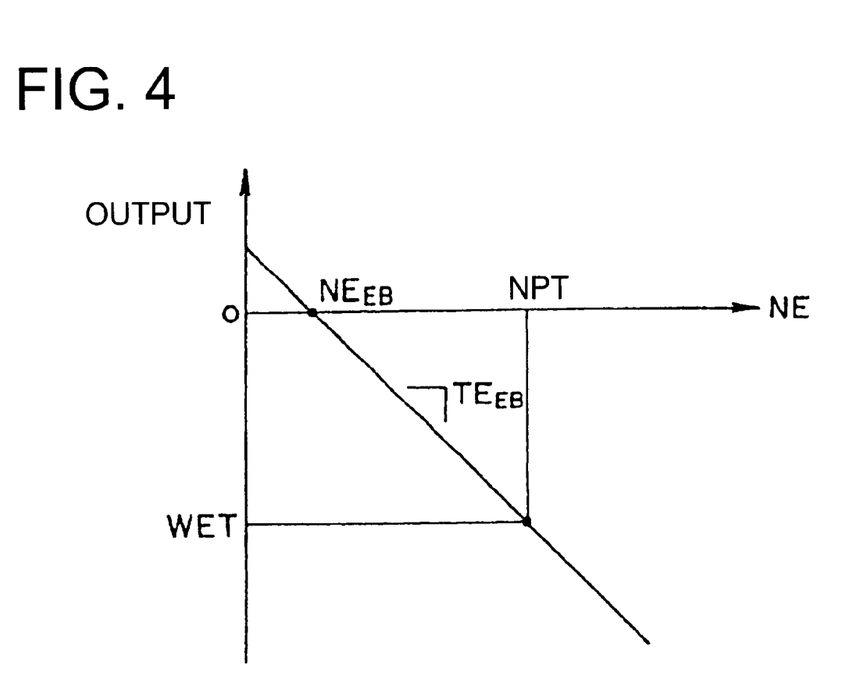
FIG. 4 is a diagram illustrating an output characteristic at a fully closed throttle against the engine speed of the gear ratio control system of the continuously variable transmission according to the embodiment of the invention.

Here, FIG. 4 approximates the output characteristics at the fully closed throttle time against the engine speed by a straight line. Here, the case in which the engine speed is low or medium is shown.

The reference speed NE$_{EB}$ is the engine speed for an engine output of 0, i.e., the idle speed of the engine, and corresponds to the coordinate of an intersection in FIG. 4 between the output characteristics at the fully closed throttle time and an abscissa indicating the engine speed. On the other hand, the learning reference torque $TE_{EB}$ indicates a gradient of the output characteristics at the fully closed throttle time of FIG. 4.

Specifically, the target primary speed setting unit 55A is constructed to have a map of the engine output characteristics, as illustrated in FIG. 4, so that the target primary speed NPT according to the target output WET may be set by using the map.

Here, the target primary speed NPT is made not to become lower than the primary speed NP for the case of an overdrive (OD). When the target primary speed NPT is lower than the division of the secondary speed NS by a gear ratio $i_{OD}$ of the overdrive (OD) (NPT<NS/$i_{OD}$), the target primary speed NPT is calculated by dividing the secondary speed NS by the gear ratio iOD at the overdrive (OD) time (NPT=NS/$i_{OD}$)

When a throttle opening voltage VHT is higher than a target throttle opening voltage VHTNPT calculated on the basis of the target primary speed NPT (VHT>$VHT_{NPT}$), on the other hand, the target primary speed NPT is the preceding target primary speed NPT.

Here, the target primary speed NPT set by the aforementioned Formula (7) is filtered at two stages by two low-pass filters arranged in series with each other and having a filtering frequency $f_{NPT}$ thereby to eliminate the minute fluctuation components.

The learning reference torque updating unit 55B updates the engine output characteristics at the fully closed throttle time on the basis of the actual primary speed (i.e., the real primary speed) at the steady running time during the downhill running so that no influence may be received from the dispersion in the engine output characteristics at the fully closed throttle time even when the throttle is fully closed during the downhill running.

Specifically, the learning reference torque updating unit 55B is provided with decision means for deciding whether or not all the later-described learning conditions (1) to (10) are satisfied continuously for a predetermined time $tTE_{EB}$ for learning decisions. When it is decided by the decision means that the learning conditions are satisfied, a learning reference torque $TE_{EB}$ (OLD) (i.e., the preceding learning reference torque), is used until the present learning conditions are satisfied, and the reference torque $TE_{EB0}$, as calculated when the present learning conditions are satisfied, are individually filtered with the filtering constant KTEEB to set the learning reference torque $TE_{EB}$ (i.e., the present learning reference torque $TE_{EB}$), and the learning reference torque $TE_{EB}$ is expressed by the following Formula (8):

$$TE_{EB}=K_{TEEB} \cdot TE_{EB0}+(1-K_{TEEB}) \cdot TE_{EB(OLD)} \qquad (8)$$

Moreover, the updating means disposed in the learning reference torque updating unit 55B updates the preceding learning reference torque $TE_{EB(OLD)}$ to the present learning reference torque $TE_{EB}$. On the other hand, decision means disposed in the learning reference torque updating unit 55B decides the engine output characteristics on the basis of the present learning reference torque $TE_{EB}$. Moreover, the engine output characteristics thus determined are used for setting the target primary speed NPT till the next learning conditions are satisfied.

Here, the reference torque $TE_{EB0}$ is calculated, as follows, on the basis of an engine driving force FEL, an engine speed NEL, a primary speed NPL, and a secondary speed NSL when the later-described predetermined learning conditions (1) to (10).

Specifically, the net engine output corresponding to the engine driving force is calculated at first by multiplying the engine driving force FEL by the division of the tire radius r by the final reduction ration iF and the secondary speed NSL [$FE_L \cdot (r/iF) \cdot NSL$]. Next, considering the loss component of the engine output, the actual engine output (or the real engine output) is calculated by adding to that net engine output, the primary loss output ($TLR \cdot NP_L$) calculated by multiplying the input revolution dependent transmission loss torque TLR and the primary speed NPL, and the engine loss output calculated by multiplying the sum of the crankshaft inertial torque TIC and the oil pump drive loss torque TLP and the engine speed NEL. Moreover, the reference torque TEEB0 is calculated as the engine torque corresponding to the real engine output by dividing that rear engine output by the subtraction of the primary speed NPL from the reference speed NEEB, and is expressed by the following Formula (9):

$$TE_{EB0}=[FE_L \cdot (r/i_F) \cdot NS_L+TLR \cdot NP_L+(TIC+TLP) \cdot NE_L]/(NE_{EB}-NP_L) \quad (9)$$

Here in this embodiment, the following learning conditions (1) to (10) are set to decide whether or not the state is steady at the downhill running time, so as to set the learning reference torque $TE_{EB}$ accurately. Here, the reason why these learning conditions are provided is that the learning is to improve the engine braking performance thereby to perform the learning accurately in the running state exerting no influence upon the improvement. The learning conditions are:

(1) that the throttle is fully closed or substantially fully closed, i.e., that the throttle opening voltage VTH is lower than a learning throttle opening voltage $VTH_{TEEB}$ (VTH<$VTH_{TEEB}$);

(2) that the braking is OFF, i.e., that a brake switch BS is OFF (BS=0);

(3) that the vehicle speed V is within a predetermined range, i.e., that the vehicle speed V is higher than the learning vehicle speed lower limit $V_{TEEB}A$ (e.g., about 10 Km/h) and lower than the learning vehicle speed upper limit $V_{TEEB}B$ (e.g., about 100 Km/h) ($V_{TEEB}A<V<V_{TEEB}B$);

(4) that the road slope SL is within a predetermined range, i.e., that the road slope SL is larger than the learning road slope lower limit $SLTE_{EB}A$ (e.g., about 5%) and smaller than the learning road slope upper limit $SL_{TEEB}B$ (e.g., about 10 to 15%) ($SL_{TEEB}A<SL<SL_{TEEB}B$);

(5) that the primary speed NP is within a predetermined range, i.e., that the primary speed NP is larger than the learning primary speed lower limit NPTEEBA (e.g., about 1,000 rpm) and smaller than the learning primary speed upper limit $NP_{TEEB}B$ (e.g., about 2,000 rpm) ($NP_{TEEB}A<NP<NP_{TEEB}B$);

(6) that the engine driving force FE is lower than the learning engine driving force $FE_{TEEB}$ (FE<$FE_{TEEB}$). The reason for this condition is that the engine braking seems to be unnecessary for a high engine driving force FE;

(7) that the gear ratio RAT (i.e., the primary speed NP/the second speed NS) is smaller than the learning gear ratio RATTEEB (RAT>$RAT_{TEEB}$). The reason for this condition is that the primary speed NP and the engine speed NE are excessive for an excessively high gear ratio;

(8) that the absolute value of the difference between the forward-backward acceleration GX and the target acceleration GXT is larger than the learning acceleration deviation $GXT_{TEEB}$ (|GXT−GX|>$GXT_{TEEB}$);

(9) that the cooler compressor switch has no ON/OFF change; and (10) that there is no direct ON/OFF change.

Here, when all the learning conditions (1) to (10) are satisfied, at every predetermined learning decision times $t_{TEEB}$, the reference torque $TE_{EB0}$ is calculated by the aforementioned Formula (6), and the learning reference torque $TE_{EB}$ is set by the aforementioned Formula (7) on the basis of that reference torque $TE_{EB0}$.

At the initial setting time, however, the learning reference torque $TE_{EB}$ is set to the learning reference torque initial value (or the first learning torque value) $TE_{EB1}$ (TEEB=TEEB1). When the next learning reference torque TEEB is higher than the learning reference torque upper limit (or the second learning torque value) $TE_{EBU}$ $TE_{EBU}$ ($_{TEEB}$>$TE_{EBU}$), on the other hand, the next learning reference torque TEEB is set to the learning reference torque upper limit $TE_{EBU}$ ($TE_{EB}$=$TE_{EBU}$). When the next learning reference torque TEEB is lower than the learning reference torque lower limit (or the third learning torque value) $TE_{EBL}$ ($TE_{EB}$<$TE_{EBL}$), the next learning reference torque TEEB is set to the learning reference torque lower limit TEEBL (TEEB=TEEBL). Here, the data of the learning reference torque TEEB thus set are held even after OFF of the ignition key.

In the target primary speed setting means 55 thus constructed, moreover, the learning reference torque updating unit 55B updates the learning reference torque $TE_{EB}$ to be used to set the target primary speed NPT is updated in the following manners.

Figure 5:
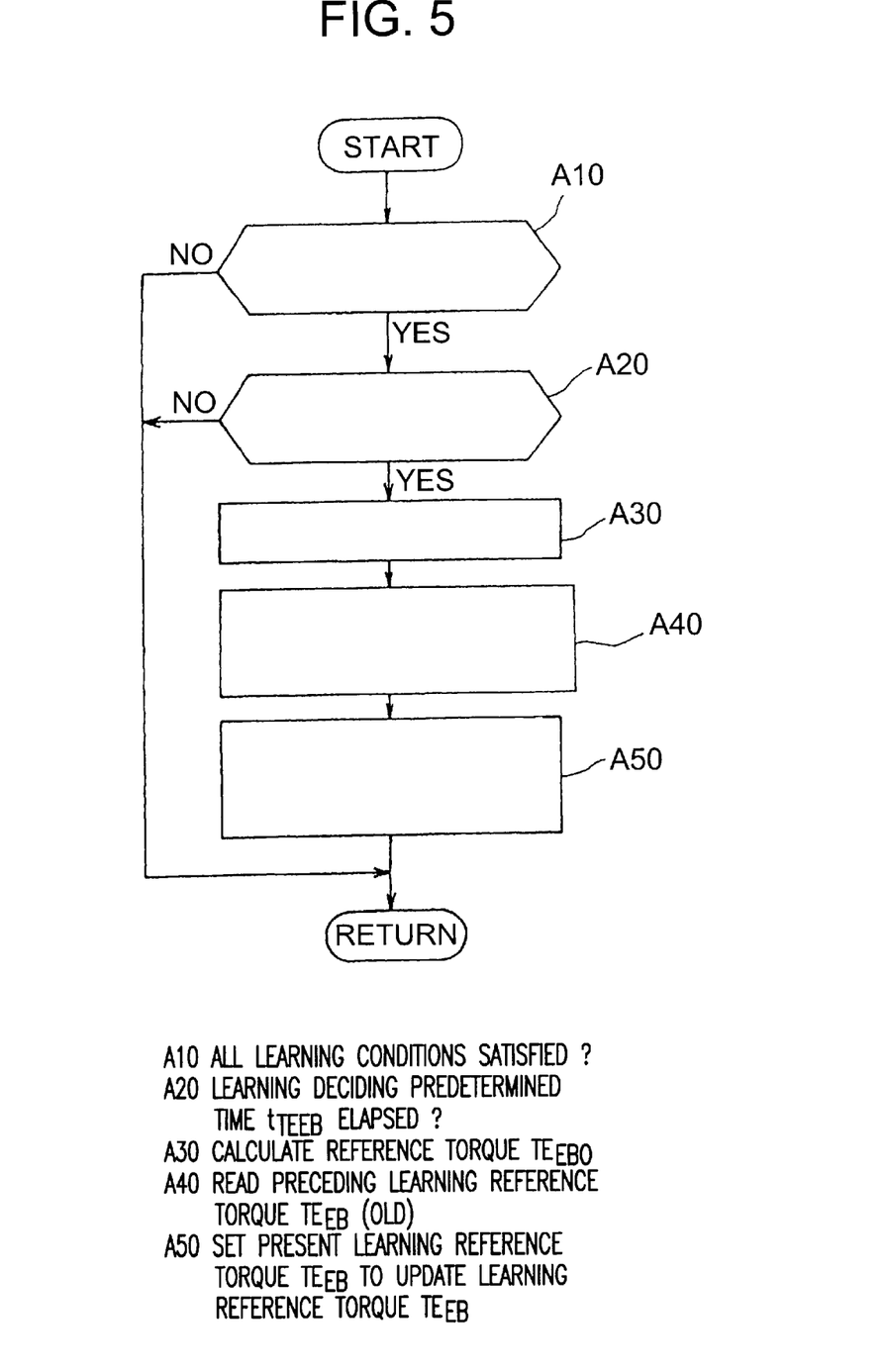
FIG. 5 is a flow chart for explaining a learning reference torque updating control in the gear ratio control system of the continuously variable transmission according to the embodiment of the invention.

As shown in the flow chart of FIG. 5, at first Step A10, it is decided, by the learning reference torque updating unit 55B, whether or not all the learning conditions (1) to (10) are satisfied. If this decision reveals that all the learning conditions (1) to (10) are satisfied, the routine advances to Step A20, at which it is decided whether or not the learning deciding predetermined time $t_{TEEB}$ has elapsed with all the learning conditions (1) to (10) being satisfied.

If this decision reveals that the learning deciding predetermined time $tTE_{EB}$ has elapsed, the routine advances to Step A30, at which the reference torque $TE_{EB0}$ is calculated. At Step A40, moreover, the preceding learning reference torque $TE_{EB(OLD)}$ is read, and the routine advances to Step A50.

At Step A50, the preceding learning reference torque $TE_{EB(OLD)}$ and the reference torque $TE_{EB0}$ calculated when the learning conditions are satisfied are individually filtered with the filtering constant $K_{TEEB}$ to set present learning reference torque $TE_{EB}$, and to update the preceding learning reference torque $TE_{EB}$ to the present learning reference torque $TE_{EB}$, and the routine is returned.

When the learning reference torque $TE_{EB}$ is thus updated, the engine output characteristics are determined on the basis of the updated learning reference torque TEEB, and the determined engine output characteristics are used for setting the target primary speed NPT until the next time when the learning conditions are satisfied.

Here, the coefficient for setting the target primary speed NPT from the target driving force FET, as described above, is so sequentially corrected that the actual forward-backward acceleration (or the forward-backward G) and the target acceleration GXT may coincide.

Figure 6A:
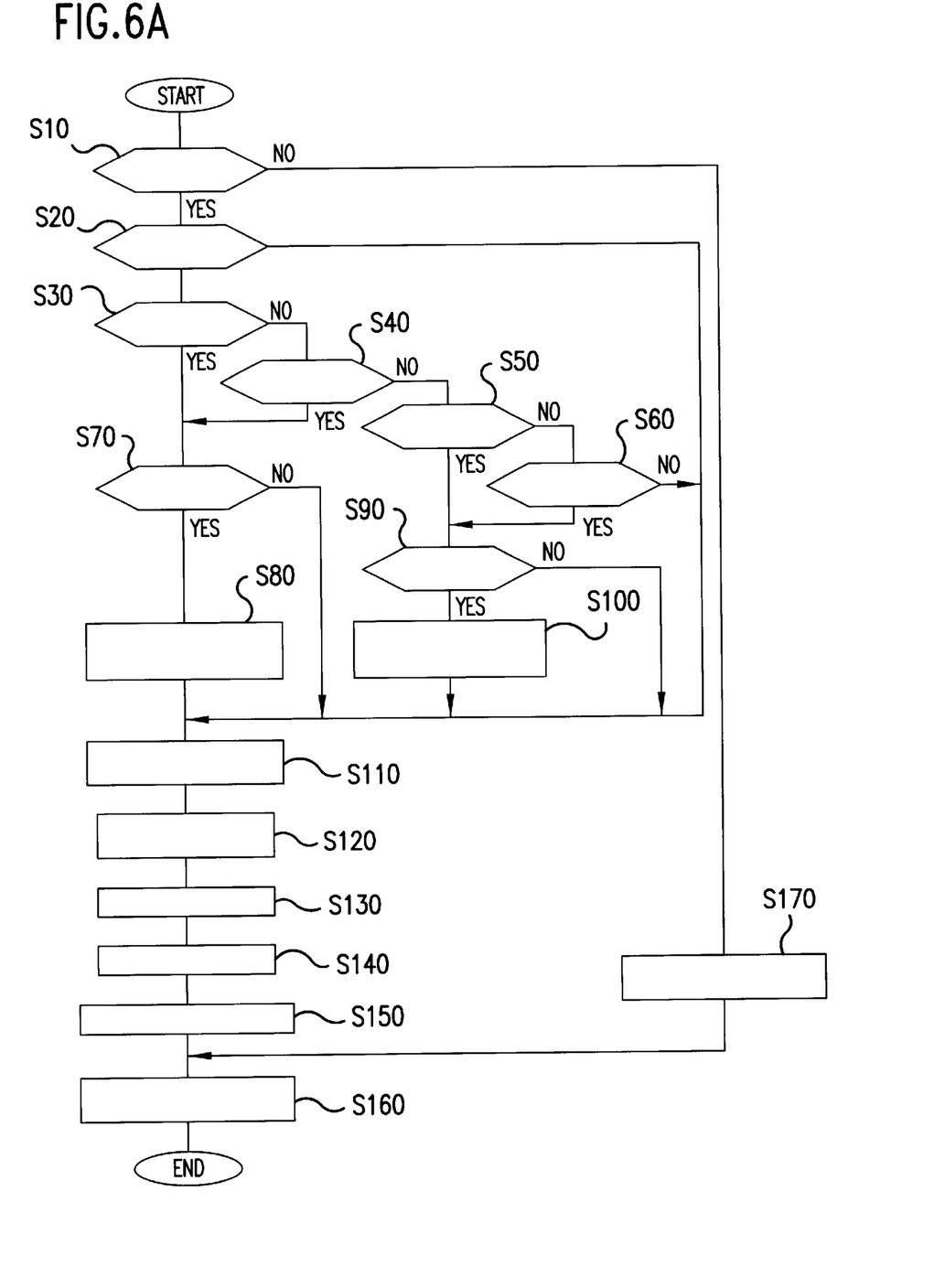
FIGS. 6(a) and 6(b) are a flow chart for explaining a gear ratio control by the gear ratio control system of the continuously variable transmission according to the embodiment of the invention.
Figure 6B:
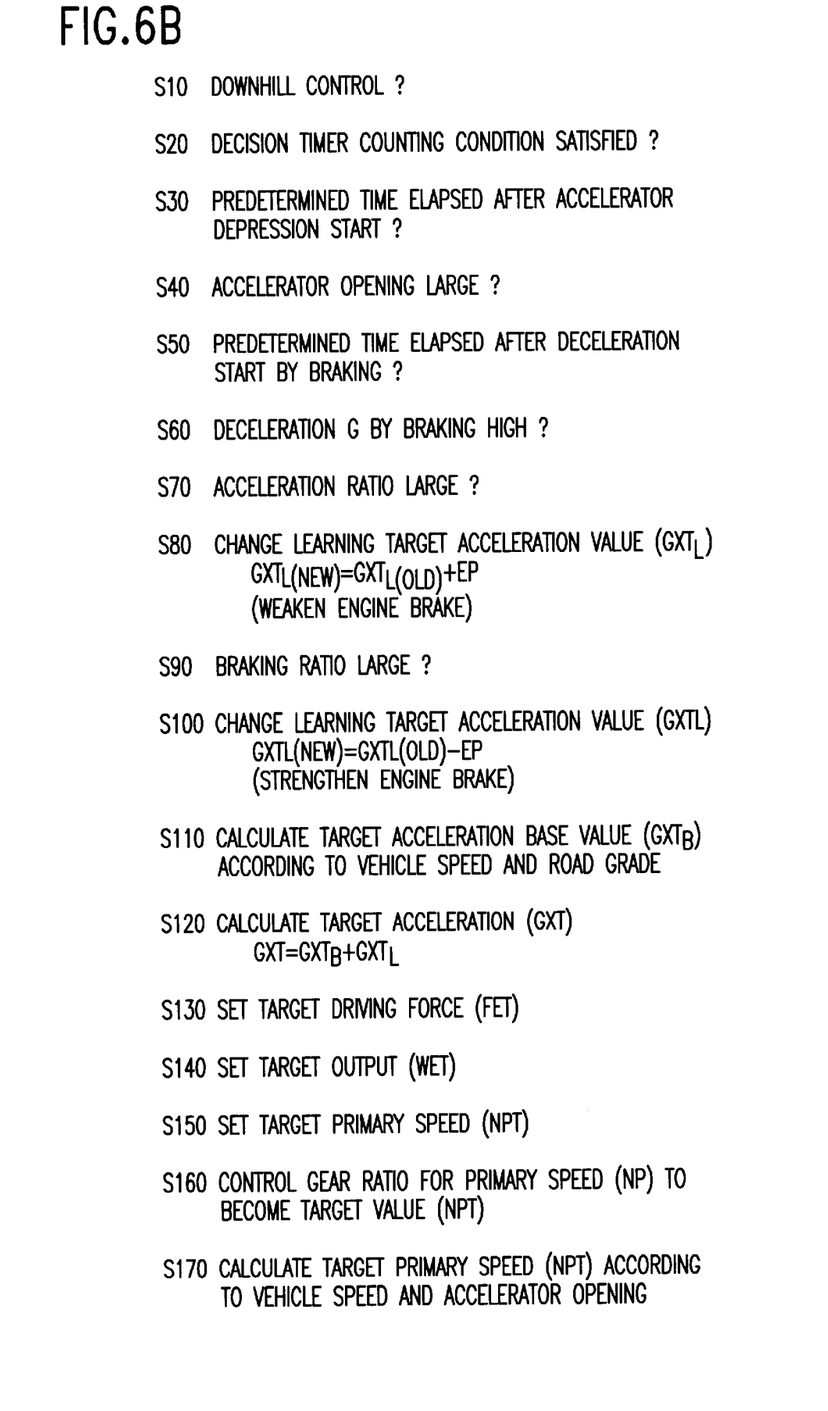

The gear ratio controls by the gear ratio control system of the continuously variable transmission thus constructed according to the embodiment of the invention are made, as shown in the flow chart of FIGS. 6(a) and 6(b).

As shown in FIGS. 6(a) and 6(b), at Step S10, it is decided by the downhill deciding means 51 whether or not the vehicle is running on a downhill road. If this decision reveals the downhill running, the routine advances to Step S20.

At Step S20, the properness deciding means 52C decides whether or not the excess deciding timer counting conditions (or the deficiency deciding timer counting conditions) are satisfied. If these conditions are satisfied, the routine advances to Step S30.

At Step S30, it is decided whether or not the predetermined time tKG has elapsed from the accelerator depression start. The routine advances to Step S70, if the predetermined time $t_{KG}$ elapses (TKG=$t_{KG}$), but to Step S40 if not (TKG<$t_{KG}$).

At Step S40, it is decided whether or not the accelerator opening is large, that is, whether or not the accelerator is largely depressed. The routine advances to Step S70, if the accelerator is largely depressed (VTH≧VTH$_{TKGS}$), but to Step S50 if not (Vth<VTH$_{TKGS}$).

At Step S50, it is decided whether or not the predetermined time tFG has elapsed from the deceleration start by the braking. The routine advances to Step S90, if the predetermined time tFG has elapsed (TFG=$t_{FG}$), but to Step S60 if not (TFG=$t_{FG}$)

At Step S60, it is decided whether or not the braking deceleration GXBG is high, that is, whether or not the brake pedal is largely depressed. The routine advances to Step S90, if the brake pedal is largely depressed (GXBG≧GXBG$_{TFG}$), but to Step S110 if not (GXBG<GXBG$_{TFG}$).

At Step S70, it is decided whether or not the acceleration ratio (i.e., the time ratio for the accelerator to be depressed) exceeds a predetermined value, that is, whether or not the depression time ratio TTH is larger than the predetermined excess deciding depression time ratio TTH$_{KG}$. If the depression time ratio TTH is smaller than the excess deciding depression time ratio TTH$_{KG}$ (TTH<TTH$_{KG}$), the routine advances to Step S110. If the depression time ratio TTH is larger than the excess deciding depression time ratio TTH$_{KG}$ (TTH>TTH$_{KG}$), the properness deciding unit 52C decides that the engine braking is excessive, and the routine advances to Step S80.

At Step S80, moreover, the learning correcting unit 52B corrects the target acceleration learning value GXTL to increase by using the foregoing Formula (3) on the basis of the decision of the engine braking excess by the properness deciding unit 52C, and the routine advances to Step S110.

At Step S90, on the other hand, it is decided whether or not the braking ratio (i.e., the time ratio for the braking) exceeds a predetermined value, that is, whether or not the braking time ratio TBR is larger than the predetermined deficiency deciding braking time ratio TBR$_{FG}$. If the braking time ratio TBR is not more than the deficiency deciding braking time period TBR$_{FG}$ (TBR≦TBR$_{FG}$), the routine advances as it is to Step S110. If the braking time ratio TBR is more than the deficiency deciding braking time period TBR$_{FG}$ (TBR>TBR$_{FG}$), the properness deciding unit 52C decides that the engine braking is deficient, and the routine advances to Step S100.

At Step S100, moreover, the learning correcting unit 52B corrects the target acceleration learning value GXTL to decrease by using the foregoing Formula (3) on the basis of the decision of the engine braking deficiency by the properness deciding unit 52C, and the routine advances to Step S110.

Next, at Step S110, the target acceleration setting means 52 sets the target acceleration base value GXT$_B$ from the vehicle speed V and the road slope SL (SL=the weight×the slope resistance RS/the vehicle weight W).

At Step S120, moreover, the target acceleration GXT (GXT=GXT$_B$+GXT$_L$) is calculated by adding the target acceleration learning value $GXT_L$ to the target acceleration base value GXTB set at Step S110. This target acceleration learning value $GXT_L$ is the target acceleration learning value $GXT_L$ corrected to increase, when it is corrected to increase and learned at Step S80 by the learning correcting unit 52B, but corrected to decrease, when it is corrected to decrease and learned at Step S100 by the learning correcting unit 52B. In the remaining cases, the target acceleration learning value $GXT_L$ is the target acceleration learning value GXTL which was learned and corrected in the preceding downhill control. As a result, the target acceleration GXT is set according to the driving state of the driver.

At Step S130, moreover, the target driving force setting means 53 sets the target driving force FET for realizing the target acceleration GXT set at Step S120. At next Step S140, the target output setting means 54 sets the target output WET to establish the target driving force FET set at Step S130.

Next, the routine advances to Step S150, at which the target primary speed setting means 55 sets the target primary speed NPT to establish the target output WET set at Step S140.

Then, the routine advances to Step S160, at which the primary pulley control means 56 sets the feedback control signal corresponding to the control of the primary pulley 21 so that the real primary speed NP may become the target primary speed NPT set at Step S150 to make the gear ratio control of the primary pulley 21, and the primary pulley control means 56 outputs a control signal to the flow rate control valve 64. As a result, the gear ratio is controlled so that the real acceleration becomes the target acceleration GXT set at Step S120 thereby to establish the engine braking state according to the taste of the driver.

Here, if it is decided at Step S10 that the vehicle is not running on a downhill road, the routine advances to Step S170. At Step S170, the target primary speed setting means 55 sets the target primary speed NPT in accordance with the vehicle speed and the accelerator opening. Then, the routine advances to Step S160, at which the primary pulley control means 56 sets the feedback control signal corresponding to the control of the primary pulley 21 so that the real primary speed NP may become the target primary speed NPT set at Step S170, and primary pulley control means 56 outputs the control signal to the flow rate control valve 64 to perform the gear ratio control of the primary pulley 21.

According to the gear ratio control system of the present continuously variable transmission, therefore, the target acceleration learning value $GXT_L$ is corrected to increase and learned, when the accelerator depression time ratio during the downhill running is large, but is corrected to decrease and learned when the brake pedal depression time ratio is large. As a result, the target acceleration GXT according to the driving state of the driver can be set to provide an advantage that the engine braking state according to the taste of the driver can be realized.

Especially the continuously variable transmission cannot decide the excess/deficiency of the engine braking unlike discontinuous automatic transmission in terms of the upshift/downshift of the shift lever. There is another advantage that the excess/deficiency of the engine braking can be accurately decided by monitoring the acceleration ratio or the braking ratio using the detection signal of the throttle opening sensor 11 or the braking decelerating switch 12 as in the present gear ratio control system.

According to the gear ratio control system of the present continuously variable transmission, therefore, the real primary speed NP is controlled to become the target primary speed NPT set during the downhill running on the basis of the target output WET thereby to reduce (or downshift) the gear ratio of the CVT 20. There is another advantage that a proper engine braking is applied to the vehicle at the downhill running time especially with the fully closed throttle.

Since the gear ratio control of the CVT 20 is made so that the real primary speed NP may become the target primary speed NPT corresponding to the target output WET, on the other hand, the target primary speed can be determined from the vehicle speed and the throttle opening, and the common portion shared with the feedback control at a normal time during a flat road running for the feedback control to make the real primary speed coincide with the target primary speed can be effectively utilized. There is another advantage that the program capacity can be suppressed to a small value to prevent the controls from being complicated. Since no switching occurs in the control line, moreover, there is another advantage that the gear ratio cannot abruptly change to prevent any physical disorder. This makes it possible to prevent the drivability from being deteriorated.

Here, in the embodiment thus far described, the target primary speed setting means 55 sets the target acceleration GXT on the basis of the road slope SL and the vehicle speed V, the target driving force FET on the basis of the target acceleration GXT, the target output WET on the basis of the target driving force FET, and the target primary speed NPT on the basis of the target output WET. However, the method of setting the target output WET should not be limited to the aforementioned method but may set the target output WET on the basis of the target acceleration GXT, for example.

In the embodiment thus far described, on the other hand, the target primary speed setting means 55 uses the reference torque $TE_{EB}$ for setting the target primary speed NPT, and the reference torque $TE_{EB}$ is set every times when the predetermined learning conditions are satisfied. However, the reference torque $TE_{EB}$ may take a fixed value.

In the embodiment thus far described, on the other hand, the learning conditions are exemplified by (1) to (10). However, the learning conditions should not be limited thereto, but may be any if the steady running time at the downhill running time can be decided, and need not satisfy all the conditions. In this embodiment, on the other hand, the learning reference torque $TE_{EB}$ is set when the learning deciding predetermined time $tTE_{EB}$ elapses after the learning conditions were satisfied. When the learning conditions are satisfied, however, the learning reference torque $TE_{EB}$ may be set.

Here, in the foregoing embodiment, the invention has been described in the case in which it is applied to the belt type CVT. However, the invention can be applied to another CVT such as a toroidal CVT.

According to the gear ratio control system of the continuously variable transmission of the invention disclosed in claim 1, as has been described in detail hereinbefore, the gear ratio of the continuously variable transmission is reduced (or shifted down) by controlling the real primary speed to the target primary speed set on the basis of the target output at a downhill running time. As a result, there is an advantage that a proper engine braking is applied to the vehicle during the downhill running time especially with the fully closed throttle. Since the gear ratio control of the continuously variable transmission is made so that the real primary speed may become the target primary speed corresponding to the target output, on the other hand, the target primary speed can be determined from the vehicle speed and the throttle opening, and the common portion shared with the feedback control at a flat road running time for the feedback control to make the real primary speed coincide with the target primary speed can be effectively utilized. There is another advantage that the program capacity can be suppressed to a small value to prevent the controls from becoming complicated.

According to the gear ratio control system of the continuously variable transmission of the invention disclosed in claim 2, on the other hand, the learning reference torque is updated when the learning conditions are satisfied, and the engine output characteristics are set on the basis of the updated learning reference torque, so that the gear ratio control of the continuously variable transmission is made on the basis of the input speed, as set depending upon the engine output characteristics, of the input unit of the continuously variable transmission. Even with the fully closed throttle during the downhill running time, therefore, the gear ratio control can be accurately made without being influenced by the dispersion in the engine output characteristics with the fully closed throttle. There is another advantage that a stable engine braking feel can be achieved.

According to the gear ratio control system of the continuously variable transmission of the invention disclosed in claim 3, on the other hand, during the downhill running time, the target acceleration is set according to the road slope, and the gear ratio is controlled so that the real acceleration may become the target acceleration. At the same time, the excess/deficiency of the engine braking is decided so that the target acceleration is learned and corrected on the basis of the decision result. As a result, an advantage that the target acceleration can be set according to the running state thereby to realize the engine braking state according to the preference of the driver is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A speed ratio control system for controlling speed ratios of a continuously variable transmission coupled to an engine, comprising:
   a setting element for setting a target speed of an input unit of the continuously variable transmission at a downhill running time on the basis of a target output of said engine; and
   a control element for controlling the speed ratios of the continuously variable transmission such that an actual speed of said input unit becomes the target speed of said input unit,
   wherein said setting element includes,
      a decision element for determining whether or not learning conditions are satisfied with a fully closed throttle,
      an updating element for updating a learning reference torque when said decision element determines that the learning conditions are satisfied, on the basis of one of a reference torque and the engine torque corresponding to an actual engine output, and a learning reference torque set at the preceding time of satisfying the learning conditions, and
      a determining element for determining engine output characteristics on the basis of the learning reference torque updated by said updating element.

2. gear ratio control system for a continuously variable transmission according to claim 1,
   wherein said setting element includes,
      a target acceleration setting element for setting a target acceleration according to a road slope,
      a target output setting element for setting a target output of the engine in accordance with said target acceleration, and
      a target speed setting element for setting the target speed of the input unit of said continuously variable transmission in accordance with said target output.

3. A speed ratio control system for controlling speed ratios of a continuously variable transmission coupled to an engine, comprising:
   a setting element for setting a target speed of an input unit of the continuously variable transmission at a downhill running time on the basis of a target output of said engine; and
   a control element for controlling the speed ratios of the continuously variable transmission such that an actual speed of said input unit becomes the target speed of said input unit,
   wherein said setting element includes,
      a target acceleration setting element for setting a target acceleration according to a road slope such that an actual acceleration becomes said target acceleration,
      a properness deciding element for determining excess/deficiency of an engine braking, and
      a learning correcting element for learning and correcting said target acceleration on the basis of the determination of said properness deciding element.

4. A speed ratio control method for controlling speed ratios of a continuously variable transmission coupled to an engine, comprising:
   setting a target speed of an input unit of said continuously variable transmission at a downhill running time on the basis of a target output of said engine; and
   controlling the gear ratios of said continuously variable transmission such that an actual speed of said input unit becomes the target speed of said input unit,
   wherein the step of setting the target speed of said input unit includes,
      determining whether or not learning conditions are satisfied with a fully closed throttle,
      updating a learning reference torque when it is determined in said determining step that the learning conditions are satisfied, on the basis of one of a reference torque and the engine torque corresponding to an actual engine output, and a preceding learning reference torque set at the preceding time of satisfying the learning conditions, and
      determining engine output characteristics on the basis of the learning reference torque updated in said updating step.

5. The speed ratio control method for a continuously variable transmission according to claim 4,
   wherein the step of setting the target speed of said input unit includes,
      setting a target acceleration according to a road slope,
      setting a target output of the engine in accordance with said target acceleration, and
      setting said target speed of the input unit of said continuously variable transmission in accordance with said target output.

6. A speed ratio control method for controlling speed ratios of a continuously variable transmission coupled to an engine, comprising:

setting a target speed of an input unit of said continuously variable transmission at a downhill running time on the basis of a target output of said engine; and controlling the gear ratios of said continuously variable transmission such that an actual speed of said input unit becomes the target speed of said input unit, wherein the step of setting the target speed of said input unit includes, setting a target acceleration according to a road slope, setting said target speed such that an actual acceleration becomes said target acceleration, determining excess/deficiency of an engine braking, and learning and correcting said target acceleration on the basis of the decision in said deciding step.

\* \* \* \* \*